United States Patent
Cho et al.

(10) Patent No.: US 11,333,314 B2
(45) Date of Patent: *May 17, 2022

(54) LIGHTING APPARATUS HAVING AN OPTICAL MODULE WITH A HALF-MIRROR MEMBER

(71) Applicant: LG INNOTEK CO., LTD., Seoul (KR)

(72) Inventors: Moo Hyun Cho, Seoul (KR); Ki Beom Kim, Seoul (KR); Hyun Duck Yang, Seoul (KR); Ki Chang Lee, Seoul (KR); Byoung Eon Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,061

(22) Filed: Jan. 2, 2021

(65) Prior Publication Data

US 2021/0123579 A1 Apr. 29, 2021

Related U.S. Application Data

(63) Continuation of application No. 16/694,940, filed on Nov. 25, 2019, now Pat. No. 10,907,790, which is a
(Continued)

(30) Foreign Application Priority Data

Oct. 22, 2014 (KR) .................. 10-2014-0143428

(51) Int. Cl.
*F21S 41/32* (2018.01)
*F21V 7/00* (2006.01)
(Continued)

(52) U.S. Cl.
CPC .............. *F21S 41/32* (2018.01); *F21S 2/00* (2013.01); *F21S 41/141* (2018.01); *F21S 43/14* (2018.01);
(Continued)

(58) Field of Classification Search
CPC .......... F21S 41/32; F21S 41/141; F21S 43/00; F21S 43/14; F21S 2/00; F21V 7/00;
(Continued)

(56) References Cited

U.S. PATENT DOCUMENTS

| 4,765,076 A | 8/1988 | Sada |
| 5,550,715 A | 8/1996 | Hawkins |

(Continued)

FOREIGN PATENT DOCUMENTS

| CN | 1607353 | 4/2005 |
| CN | 101187457 | 5/2008 |

(Continued)

OTHER PUBLICATIONS

International Search Report (with English Translation) and Written Opinion dated Feb. 26, 2016 issued in Application No. PCT/KR2015/011174.

(Continued)

*Primary Examiner* — Alan B Cariaso
(74) *Attorney, Agent, or Firm* — KED & Associates, LLP

(57) ABSTRACT

Embodiments of the present invention relate to a lighting apparatus capable of providing three-dimensional effects at the same time as the surface emission of light sources by using a half-mirror member for reflecting and transmitting parts of light. In particular, by adopting the half-mirror member for transmitting a part of and reflecting another part of light emitted from a surface-emitting light source module, the present invention allows the implementation of a mirror-like image when the light is off, and allows the implementation of a light image providing various three-dimensional effects when the light is on.

12 Claims, 13 Drawing Sheets

Related U.S. Application Data continuation of application No. 15/519,046, filed as application No. PCT/KR2015/011174 on Oct. 22, 2015, now Pat. No. 10,527,250.

(51) Int. Cl.

| | | |
|---|---|---|
| *F21S 2/00* | (2016.01) | |
| *F21S 43/14* | (2018.01) | |
| *F21S 41/141* | (2018.01) | |
| *F21V 11/00* | (2015.01) | |
| *F21Y 115/10* | (2016.01) | |
| *F21V 8/00* | (2006.01) | |

(52) U.S. Cl.
CPC ................ *F21V 7/00* (2013.01); *F21V 11/00* (2013.01); *F21Y 2115/10* (2016.08); *G02B 6/0021* (2013.01)

(58) Field of Classification Search
CPC ..... F21V 7/0091; F21V 11/00; G02B 6/0021; G02B 6/0045; G02B 6/0046; G02B 6/0048; G02B 6/0075; G02B 6/0078
See application file for complete search history.

(56) References Cited

U.S. PATENT DOCUMENTS

| | | | |
|---|---|---|---|
| 5,704,703 | A | 1/1998 | Yamada et al. |
| 6,130,784 | A | 10/2000 | Takahashi |
| 8,511,845 | B2 | 8/2013 | Jeong et al. |
| 10,527,250 | B2 | 1/2020 | Cho et al. |
| 2002/0101729 | A1 | 8/2002 | Hayashi et al. |
| 2005/0078486 | A1 | 4/2005 | Kawaguchi |
| 2007/0014127 | A1 | 1/2007 | Hara et al. |
| 2008/0316770 | A1 | 12/2008 | Oku et al. |
| 2009/0229153 | A1 | 9/2009 | Suzuki et al. |
| 2010/0110334 | A1 | 5/2010 | Oki et al. |
| 2010/0177025 | A1 | 7/2010 | Nagata et al. |
| 2011/0051412 | A1 | 3/2011 | Jeong et al. |
| 2013/0250189 | A1 | 9/2013 | Choe et al. |
| 2014/0043819 | A1 | 2/2014 | Yang et al. |
| 2015/0338048 | A1 | 11/2015 | Ahn et al. |
| 2016/0335933 | A1 | 11/2016 | Claire et al. |

FOREIGN PATENT DOCUMENTS

| | | |
|---|---|---|
| CN | 103574355 | 2/2014 |
| CN | 104819423 | 8/2015 |
| EP | 1 916 471 | 4/2008 |
| EP | 2 680 053 | 1/2014 |
| EP | 2 905 530 | 8/2015 |
| JP | H05-049515 | 6/1993 |
| JP | H07-036032 | 2/1995 |
| JP | 2001-209336 | 8/2001 |
| JP | 2007-242414 | 9/2007 |
| JP | 2008-070698 | 3/2008 |
| JP | 2008-233113 A | 10/2008 |
| WO | WO 2013/180519 | 12/2013 |
| WO | WO 2014/051394 | 4/2014 |
| WO | WO 2014/098436 | 6/2014 |

OTHER PUBLICATIONS

European Search Report dated Jun. 29, 2017 issued in Application No. 15852341.5.
Chinese Office Action dated Dec. 28, 2018 issued in Application No. 201580057888.5.
U.S. Office Action dated May 16, 2019 issued in parent U.S. Appl. No. 15/519,048.
Korean Office Action dated Nov. 15, 2019 issued in Application 10-2016-0093697.
U.S. Office Action dated Jun. 23, 2020 issued in parent U.S. Appl. No. 16/694,940.

430  440  450

(a)  (b)

| Transmittance | 50% | 40% | 30% | 20% |
|---|---|---|---|---|
| Image |  |  |  |  |
| Number of virtual images | 2~3 | 3 | 4 | 4~5 |

LIGHTING APPARATUS HAVING AN OPTICAL MODULE WITH A HALF-MIRROR MEMBER

CROSS-REFERENCE TO RELATED PATENT APPLICATIONS

This application is a Continuation Application of U.S. patent application Ser. No. 16/694,940, filed Nov. 25, 2019, which is a Continuation Application of Ser. No. 15/519,046, filed Apr. 13, 2017, which is a U.S. National Stage Application under 35 U.S.C. § 371 of PCT Application No. PCT/KR2015/011174, filed Oct. 22, 2015, which claims priority to Korean Patent Application No. 10-2014-0143428, filed Oct. 22, 2014, whose entire disclosures are hereby incorporated by reference.

TECHNICAL FIELD

The present invention relates to a lighting apparatus which allows a three-dimensional effect to be felt while surface light is emitted in a light source using a half-mirror member configured to reflect and transmit some light.

BACKGROUND ART

Light emitting devices such as light emitting diodes (LEDs) have been applied to various kinds of lighting.

Such lighting is generally applied to increase illuminance in a limited place, achieve a uniform luminous efficiency, or is variously applied and employed in a manner that adjusts luminance of vehicle lighting for satisfying a predetermined light distribution regulation.

The necessity of an application that may implement various shapes or a three-dimensional effect in consideration of design factors instead of an application of two-dimensional planar light has been increasing as a necessity in an application field of general purpose lighting.

Embodiments of the present invention are directed to providing a lighting apparatus which employs a half-mirror member configured to transmit some light emitted from a light source module configured to emit surface light and reflect the remaining light so that an image like that reflected by a mirror is implemented when the lighting apparatus is off and a light image through which various three-dimensional images are felt is implemented when the lighting apparatus is on.

One aspect of the present invention provides a lighting apparatus including a light source module including an optical member configured to guide light emitted by a light emitting unit to implement surface light emission, and an optical module including a half-mirror member configured to transmit and reflect light which passes through the light source module, wherein the optical module is disposed above the light source module.

A lighting apparatus according to embodiments of the present invention employs a half-mirror member configured to transmit some light emitted from a light source module configured to emit surface light and reflect the remaining light so that effects in that an image like that reflected by a mirror is obtained when the lighting apparatus is off and a light image through which various three-dimensional images are felt when the lighting apparatus is on can be achieved.

In addition, according to the embodiments of the present invention, since a resin layer is used as a member configured to structurally guide light to induce light, effects in that a three-dimensional effect can be felt, the lighting apparatus can be installed at various devices or places by securing flexibility thereof, the number of light emitting units can be decreased by increasing an optical efficiency thereof, and the lighting apparatus can be formed in a thin film type can be achieved.

DESCRIPTION OF DRAWINGS

FIG. 3B is a view showing an image of the lighting apparatus according to the embodiment of the present invention when the lighting apparatus is on.

FIGS. 4 and 5A and 5B are a conceptual cross-sectional view illustrating a lighting apparatus having a structure that is different from that of the first embodiment and views showing images when the lighting apparatus is on.

DETAILED DESCRIPTION

Figure 1:
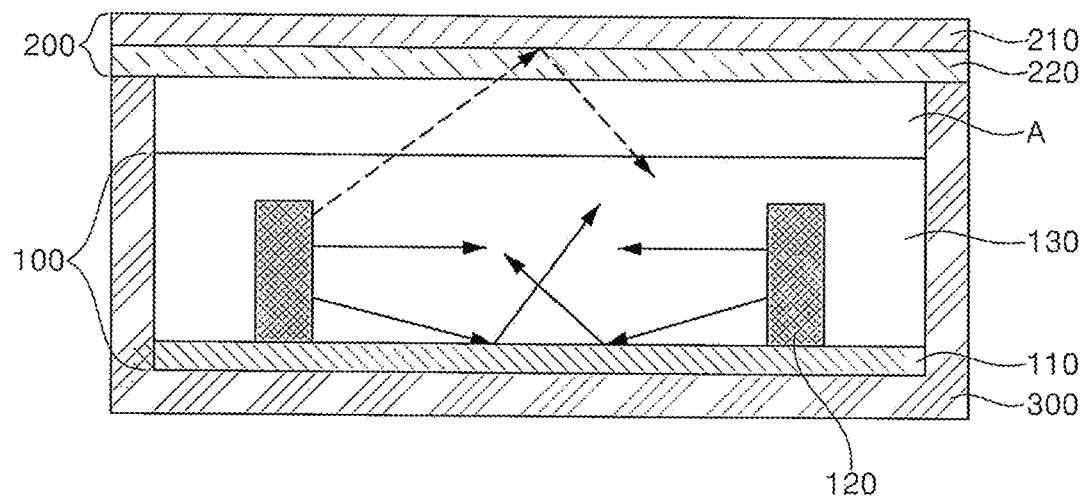
FIGS. 1 and 2 are cross-sectional views illustrating main parts of a lighting apparatus according to an embodiment of the present invention.

Hereinafter, a configuration and operations of the present invention will be specifically described with reference to the accompanying drawings. In the description with the accompanying drawings, like reference numerals in the drawings denote like elements, and thus the description thereof will not be repeated. Although the terms first, second, etc. may be used herein to describe various elements, these elements are not limited by these terms. These terms are only used to distinguish one element from another element.

First Embodiment

Figure 2:
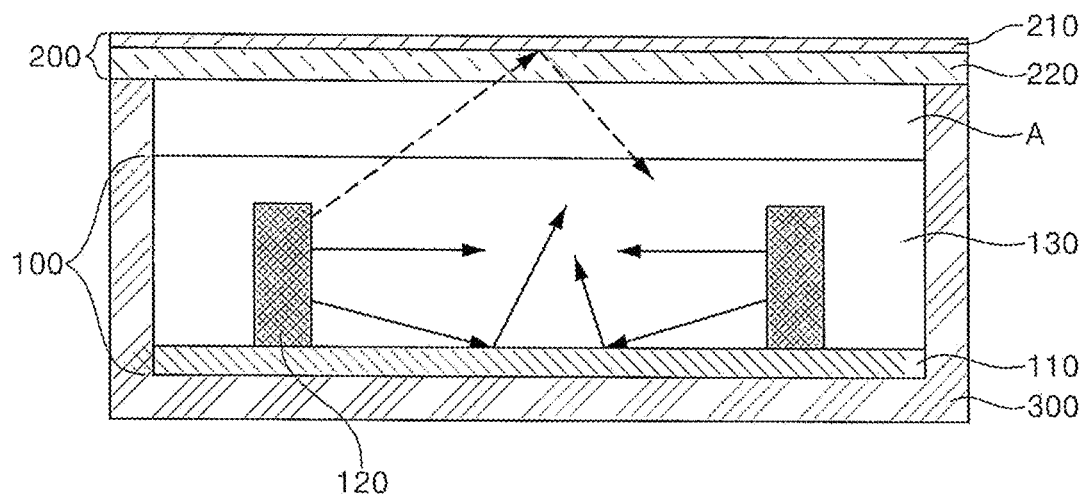

FIGS. 1 and 2 are cross-sectional views illustrating main parts of a lighting apparatus according to an embodiment of the present invention.

Referring to the illustrated drawings, the lighting apparatus according to the embodiment of the present invention may include a light source module 100 having an optical member 130 configured to emit surface light by guiding light emitted from a light emitting unit 120, and an optical module 200 having a half-mirror member 210 configured to transmit and reflect light which passed through the light source module 100. Particularly, in this case, the optical module 200 including the half-mirror member 210 may further include a diffusion member 220. In this case, the diffusion member 220 may be disposed adjacent to the half-mirror member 210. In this case, the concept "disposed adjacent to" includes a concept including a case in which the diffusion member 220 and the half-mirror member 210 are disposed to be pressed against each other as illustrated in the drawings, attached to each other and disposed by an adhesive material layer as a medium, or disposed to be spaced a predetermined distance from each other. A pressure sensitive adhesive (PSA), a thermosetting adhesive, and an ultraviolet (UV) ray cured PSA type material may be used as such an adhesive material layer.

In addition, the lighting apparatus may further include an external housing 300 configured to accommodate the light source module 100 therein.

In a structure of the lighting apparatus shown in FIG. 1, light emitted from the light emitting unit 120 is guided by the optical member 130, and surface light is emitted through an upper portion of the optical member 130. Furthermore, light emitted through the upper portion of the optical member 130 is introduced into the optical module 200 disposed to be spaced a predetermined separation space (hereinafter, referred to as a first separation portion A) therefrom, and the introduced light implements a light image having a three-dimensional effect while being reflected and transmitted by the diffusion member 220 and the half-mirror member 210.

The term "three-dimensional effect" in the embodiment of the present invention is defined as a light emission image that is implemented by a light emitting surface of the lighting apparatus and has a certain depth or volume effect. Particularly, to this end, the half-mirror member 210 included in the optical module 200 may be formed as a film member having a structure in which a metal layer is deposited on a base material. The base material may include various synthetic resin films, and the metal layer may be formed by depositing or applying a metal material, such as Ni, Cr, Al, or Ti, capable of being deposited on the film base material. A member configured to transmit some light and reflect the remaining light is generally referred to as the half-mirror member 210.

Of course, even though the half-mirror member 210 in a separate film type may be disposed above or under the diffusion member 220, the half-mirror member 210 may also be formed as an integrated structure by directly depositing the metal layer on the diffusion member 220 as illustrated in FIG. 2, and in this case, a thinner type structure may be formed. In this case, the metal layer may be deposited on one or both surfaces of the diffusion member 220, and letters or pictures may also be added as specific shapes.

Furthermore, in a structure shown in FIG. 1, when a film layer on which a specific pattern has been formed is added between the half-mirror member 210 and the diffusion member 220, an image of a letter or figure may also be implemented in a three-dimensional structure.

Figure 3A:
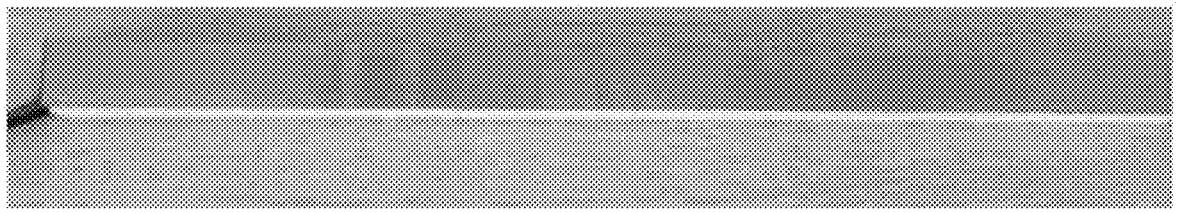
FIG. 3A is a view showing an image of the lighting apparatus according to the embodiment of the present invention when the lighting apparatus is off.
Figure 3B:

In addition, in the structure of the lighting apparatus, the first separation portion A may be disposed between the optical module 200 and the light source module 100 to uniformly deliver light of a surface-light-emission-light source, and particularly, the first separation portion A may be formed to have a range of 5 to 10 mm from an aspect of efficiency of surface light emission. That is, when the lighting apparatus is off, an image like that reflected by a mirror is implemented due to the half-mirror member 210 (see FIG. 3A), and when the lighting apparatus is on, an image of the surface light emission (see FIG. 3B) may be implemented. It is preferable for the range of the above-described separation portion to be satisfied to implement such uniformity of surface light emission.

In addition, the light emitting unit 120 applied to the lighting apparatus according to the embodiment of the present invention may be disposed to have a structure in which the light emitting unit 120 is mounted on a printed circuit board (PCB) 110, and in this case, the board 110 may secure flexibility of the entire lighting apparatus using a flexible PCB having flexibility.

In addition, one or more light emitting units 120 are arranged on the flexible PCB 110 to emit light, and the light emitting unit 120 according to one embodiment may be formed as a side view type light emitting diode (LED). When compared to use of a top view type LED, since light that will be transmitted upward may be transmitted through the optical member 130 when the side view type LED is used, there is an advantage in that a thickness of the optical member 130, in which the stacked light emitting units 120 are embedded, is thinned because intensity of the light is adjustable. Particularly, when the optical member 130 is formed using a flexible resin like in the embodiment of the present invention, there may be an advantage in that flexibility of the resin layer is secured while uniformity of light of a light emitting surface with a planar plate structure is secured. That is, when a top view type LED is used, light is emitted upward. In this case, a range within which light is spread around the LED is narrow. When a side view type LED is used, since light is widely spread through side surfaces thereof, a light spreading characteristic is improved and a characteristic of securing an amount of light is improved so that the number of light sources may be decreased. That is, an LED having a structure which emits light toward side surfaces thereof rather than a structure which emits light directly upward may be used as the light emitting unit 120 according to the embodiment.

In addition, the light emitting unit 120 according to the embodiment of the present invention may be formed in a structure in which the light emitting unit 120 is embedded in the optical member 130. In this case, the optical member 130 may be formed by applying and curing a resin having a predetermined viscosity on the light emitting unit 120, and the optical member 130 preferably has a predetermined flexibility even after the resin is cured. In addition, when the light emitting unit 120 is formed in the structure in which the light emitting unit 120 is embedded in the optical member 130, since the optical member 130 including the resin and the light emitting unit 120 is integrally formed, the structure thereof is simplified. In addition, when a light emitting element such as an LED used as the light emitting unit 120 is used, since a refractive index of a phosphor silicon disposed in front of the LED is different from that of the resin layer, which is the optical member 130, that is, since the refractive index is different from that of when light is directly emitted to air, there is an effect in that an amount of light emitted from the LED is increased. Specifically, since the refractive index of the phosphor silicon is typically 1.5 and that of the resin layer is typically 1.47, and a critical angle is increased as a difference of refractive indexes between media through which light passes is decreased, light lost inside the LED is decreased and a large amount of light can be secured.

In addition, when the light emitting unit 120 is formed in a structure in which the light emitting unit 120 is inserted into the optical member 130, since a thickness of the entire lighting apparatus may be thinned when compared to a conventional structure in which a light guide plate is disposed at a top surface thereof, and may be formed in a structure in which light is directly emitted toward an inside of the optical member 130, there is an advantage in that an amount of lost light is decreased and optical efficiency is increased.

In addition, since the light emitting unit 120 including a side view type LED is disposed as a vertical type in the lighting apparatus according to the embodiment of the present invention and the resin layer configured to diffuse and reflect light is used to diffuse and induce the light upward, the total number of light emitting units 120 can be decreased and a total weight and thickness of the lighting apparatus can be significantly decreased.

The optical member 130 is disposed on the light emitting unit 120, and particularly, the optical member 130 according to the exemplary embodiment of the present invention is formed in a structure having a planar plate type and flexibility (hereinafter, referred as a resin layer) using a resin to diffuse and induce light emitted from the light emitting unit 120 forward. That is, since the resin layer is formed in a structure in which the light emitting unit 120 is embedded, the resin layer serves to disperse light emitted from light emitting unit 120 in a lateral direction.

The resin layer according to the embodiment may basically be made of a resin having a material capable of diffusing light. For example, the above-described resin layer according to one embodiment may be made of an UV curable resin including an oligomer, and more particularly, may be made of a resin having a urethane acrylate oligomer as a main material. For example, the resin in which a urethane acrylate oligomer, which is a synthetic oligomer, and a polymer type, which is a polyacryl, are mixed may be used. Of course, the resin layer may further include a monomer mixed with isobornyl acrylate (IBOA), which is a low boiling point diluent type reactive monomer, hydroxylpropyl acrylate (HPA), 2-hydroxyethyl acrylate (2-HEA), and the like, and a photoinitiator (such as 1-hydroxycyclohexyl phenyl-ketone and the like), an antioxidant, or the like may be mixed into the resin layer as an additive. However, the above description is only one embodiment, and the resin layer may be formed with a suitable resin capable of performing a light diffusing function which is currently being developed and commercialized or may be implemented according to future technological developments.

According to the embodiment of the present invention, since the optical member is formed in the resin layer structure, a thickness of the light guide plate can be significantly decreased when compared to that of a conventional light guide plate, and thus there are advantages in that an entire product can be a thin film type and can be easily applied to a curved surface due to having a flexible material, a degree of design freedom can be improved, and the product can also be applied to other flexible displays, lamps of a severely curved front or rear surface of a vehicle, or the like.

Second Embodiment

Figure 4:
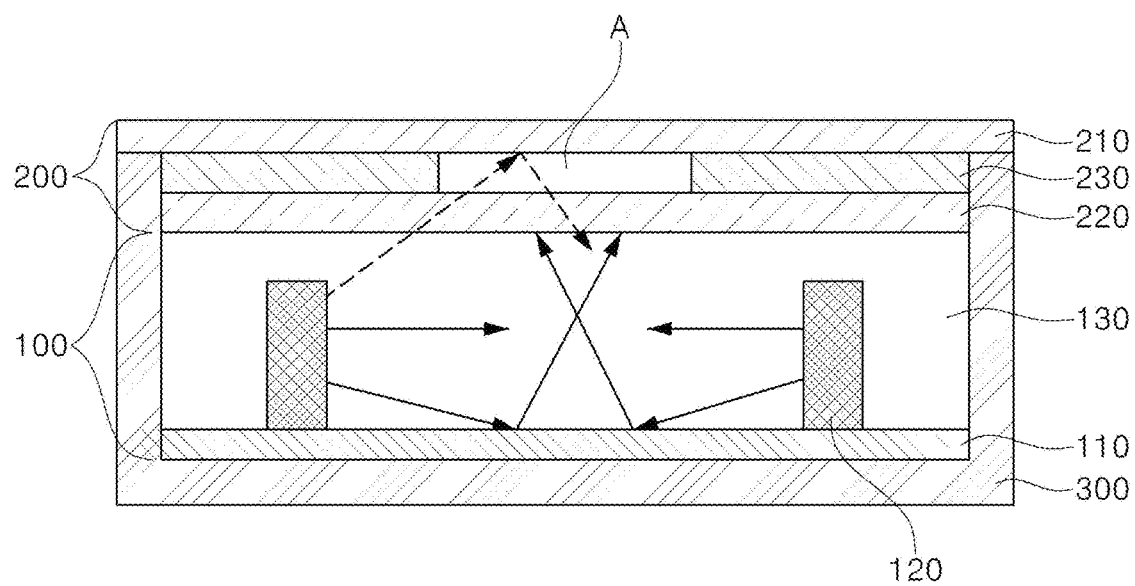
Figure 5A:
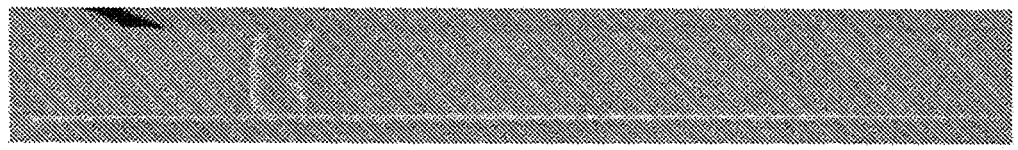
Figure 5B:

FIGS. 4, 5A and 5B are a conceptual cross-sectional view illustrating a lighting apparatus having a structure that is different from that of the above-described first embodiment and views showing images when the lighting apparatus is on.

A structural difference of the second embodiment compared to the above-described first embodiment is that at least one optical pattern layer 230 is disposed between a half-mirror member 210 and a diffusion member 220 in a structure of an optical module 200 even though a structure of a light source module 100 is the same as that of the first embodiment. In addition, a separation space between the light source module 100 and the optical module 200 is eliminated.

Since the optical pattern layer 230 is disposed above a light emitting unit 120, a hot spot problem in which a surface of an optical member 130 or surfaces of optical members are deteriorated due to intense light emitted from the light emitting unit 120 may be prevented.

A shielding structure (a film, a substrate, and the like) configured to use a separate structure to shield light may be applied to the optical pattern layer 230, and the optical pattern layer 230 may also be formed in a pattern having a light shielding function by printing a light shielding material on a top surface of a diffusion member or on a separate film.

Features of the second embodiment are that surface light may be emitted even without a separation space, a mirror image is implemented when the lighting apparatus is off, a surface light emission image may be implemented when the lighting apparatus is on, and thus a thickness of the entire lighting apparatus can be reduced.

Third Embodiment

Figure 6:
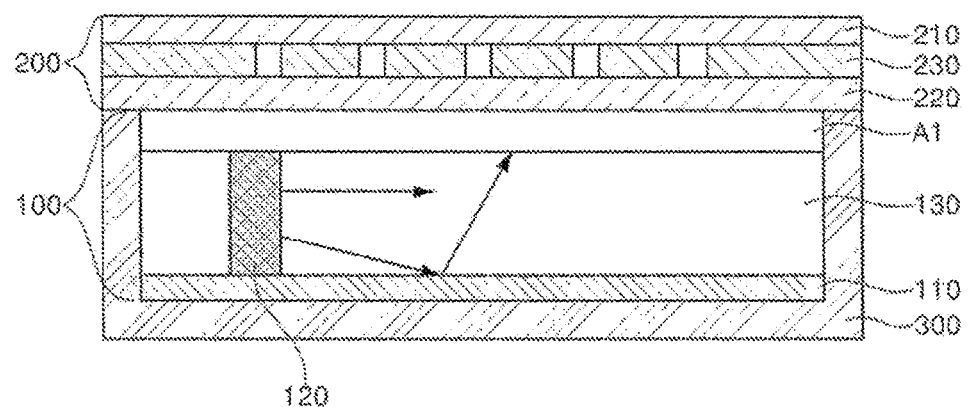
FIGS. 6 and 7 are views illustrating modified structures that are different from that of the lighting apparatus according to the above-described embodiment.
Figure 7:
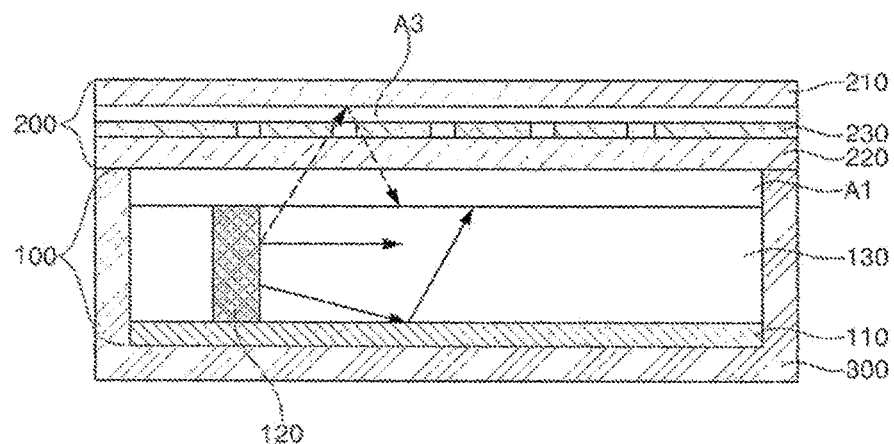

FIGS. 6 and 7 are views illustrating modified structures that are different from that of the lighting apparatus according to the above-described embodiment.

A structural difference of a lighting apparatus according to the third embodiment in comparison to those of the above-described first and second embodiments is that at least one optical pattern layer 230 is disposed between a half-mirror member 210 and a diffusion member 220, and a pattern structure having a reflecting function rather than a member having a simple shielding function is disposed in an optical module 200 even though a structure of a light source module 100 is the same as those of the first and second embodiments. That is, when a desired pattern or draft proposal pattern is processed and patterned on a metal thin film layer member such as an Ag film to form the optical pattern layer 230 and the optical pattern layer 230 is disposed between the half-mirror member 210 and the diffusion member 220 in the optical module 200, an image having a three-dimensional effect as well as reflection and surface light emission effects of the half-mirror member implemented in the lighting apparatus according the present invention may be implemented.

As illustrated in FIG. 6, in an arrangement structure of the optical pattern layer 230, the optical pattern layer 230 is disposed between the half-mirror member 210 and the diffusion member 220. In the illustrated structure, a first separation portion A1 is formed between the light source module 100 and the optical module 200 to improve efficiency of surface light emission, and the above-described pattern of the optical pattern layer 230 is not viewed due to a mirror image of the half-mirror member 210 when the lighting apparatus is off, however, characters or images patterned in an optical pattern are emitted to have a structure having a three-dimensional effect when the lighting apparatus is on.

FIG. 7 is a view illustrating a separation space (hereinafter, referred as a second separation portion A3) formed between the above-described optical pattern layer 230 and the half-mirror member 210 shown in FIG. 6, through which a depth effect of a three-dimensional image may be adjusted more realistically.

Figure 8A:
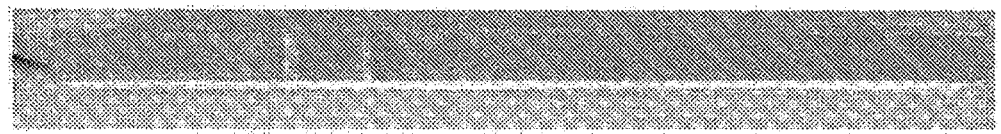
FIGS. 8A, 8B and 9A-9C are views illustrating exposed images when the lighting apparatus according to the embodiment of the present invention is on and off.
Figure 8B:

FIG. 8A is a view showing an entire mirror image of the lighting apparatus when the lighting apparatus is off, and FIG. 8B is a view showing an image in which an optical pattern is exposed when the lighting apparatus is on.

Figure 9A:
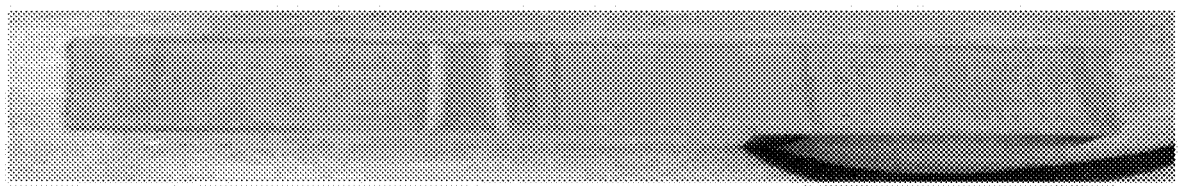
Figure 9B:
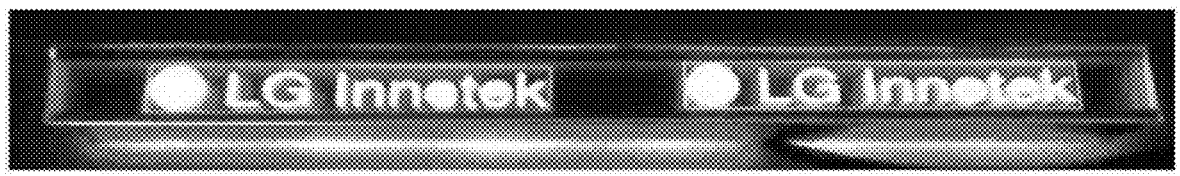
Figure 9C:
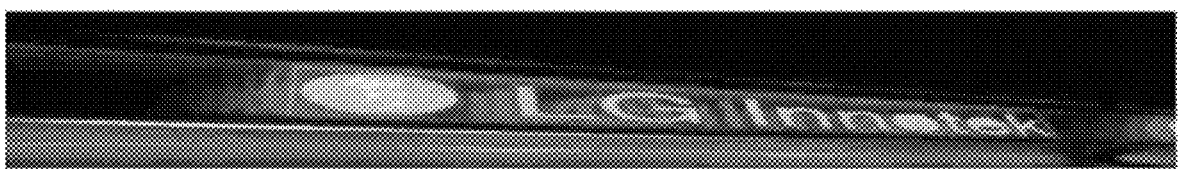

Particularly, referring to images shown in FIG. 9, a light emitting surface of the lighting apparatus is exposed in a mirror image when the lighting apparatus is off, as illustrated in FIG. 9A, but it can be seen that characters, letters, and the like are emitted to have a structure having a three-dimensional effect when the lighting apparatus is on when referring to FIGS. 9B and 9C.

Fourth Embodiment

The fourth embodiment is a modification of the above-described embodiments in that an optical member including a half-mirror member 210 is disposed above a light source module 100 without a diffusion member to implement a three-dimensional effect of a light source itself.

Figure 10:
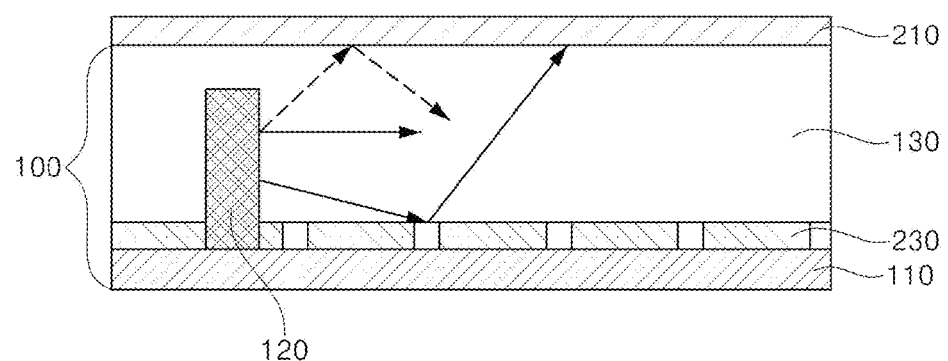
FIGS. 10, 11A-11C, 12, 13A-13C, and 14 to 22 are cross-sectional views illustrating main parts of structures according to various different embodiments of the present invention and images to which the various embodiments are applied.

Referring to FIG. 10, the light source module 100 is similar to those of the other embodiments in that the light source module 100 includes a PCB 110, a light emitting unit 120, and an optical member 130 having a resin layer. However, there are differences in that the half-mirror member 210 is disposed to be directly pressed against an upper portion of the optical member 130 or to be spaced a predetermined separation space (1 to 2 mm) from the optical member 130, and particularly, an optical pattern layer 230 in which optical patterns such as characters, a logo, or the like are patterned is disposed between the PCB 110 and the optical member 130.

Figure 11A:
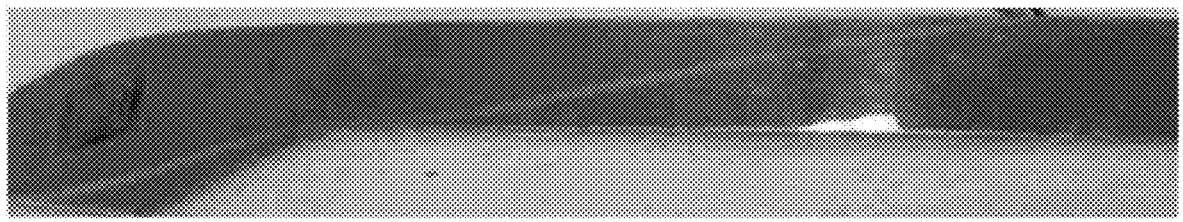
Figure 11B:
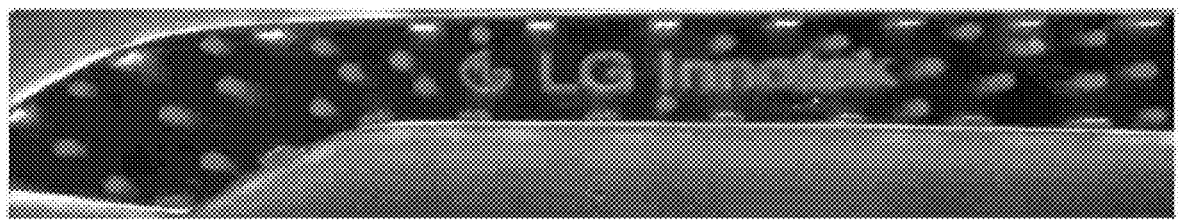
Figure 11C:
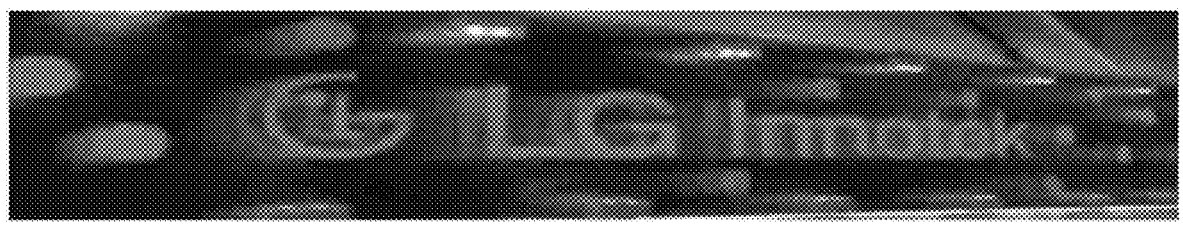

Due to such an arrangement structure, it can be seen that a mirror image is implemented when a lighting apparatus is off as illustrated in FIG. 11A, but an image of an optical pattern layer is variously displayed to have a three-dimensional effect when the lighting apparatus is on, as illustrated in FIGS. 11B and 11C. In this case, a difference in the three-dimensional effect may be modified by changing a size and an image of the optical pattern or by adjusting a transmittance of the half-mirror member.

Figure 12:
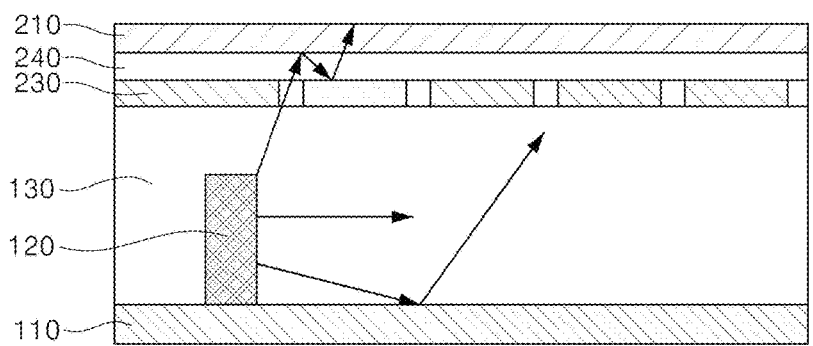

A structure shown in FIG. 12 is slightly different from that shown in FIG. 10 in that the optical pattern layer 230 is disposed above the optical member 130, and the half-mirror member 210 is disposed as an uppermost layer of the structure. Of course, in this case, an adhesive material layer 240 may be added between the half-mirror member 210 and the optical pattern layer 230. In this case, the adhesive material layer 240 has a similar function as the above-described separation portion shown in FIG. 7, secures a predetermined distance sufficient for a function of realizing a three-dimensional effect and surface light emission, and particularly, is preferably implemented in a range of 0.5 to 1.5 mm to implement a three-dimensional effect.

Figure 13A:
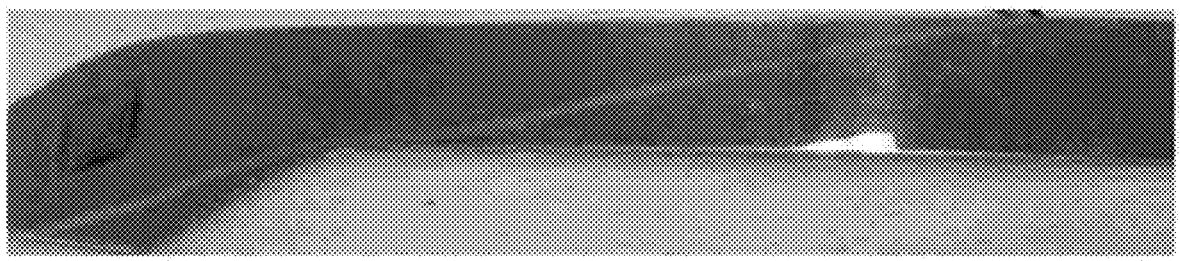
Figure 13B:
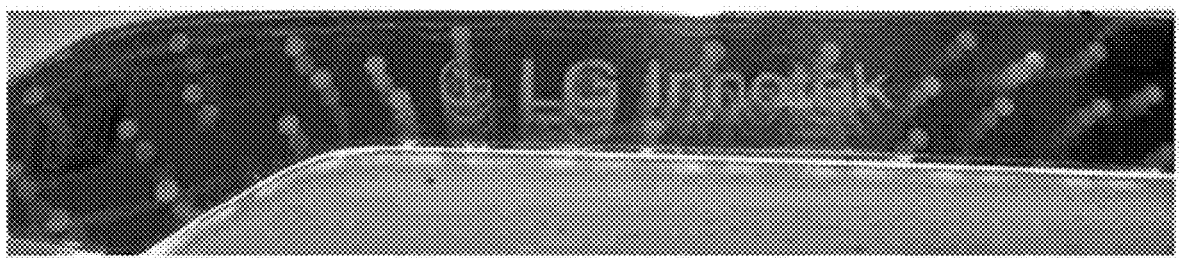
Figure 13C:
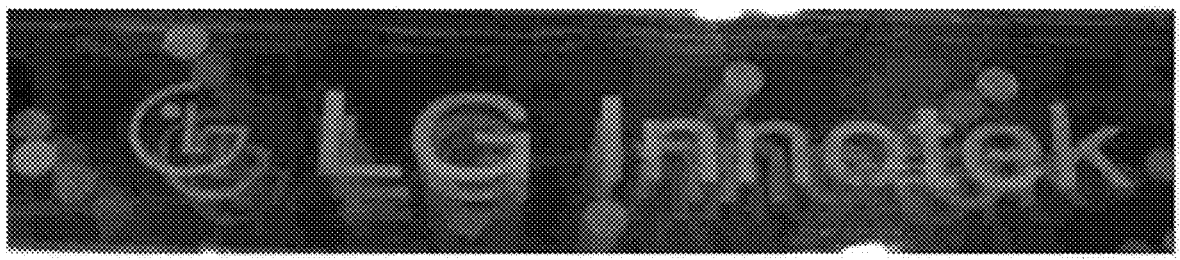

In this case, an Ag film layer having a metal reflection characteristic may be applied to the optical pattern layer 230, and through this the above-described hot spot phenomenon of the light emitting unit 120 is prevented and a light emission image may be simultaneously implemented in various three-dimensional shapes as illustrated in FIGS. 13B and 13C. Of course, a mirror image is implemented as illustrated in FIG. 13A when the lighting apparatus is off.

Fifth Embodiment

The fifth embodiment of the present invention presents a structure that implements a different three-dimensional effect by changing the structure of the above-described lighting apparatus. That is, a feature of the fifth embodiment is that a three-dimensional effect may be variously changed by a light source module 100 and a half-mirror member 120 being obliquely disposed to have a predetermined slope rather than an arrangement of a parallel structure, and adjusting an incident angle of light which is incident on the half-mirror member 120.

Figure 14:
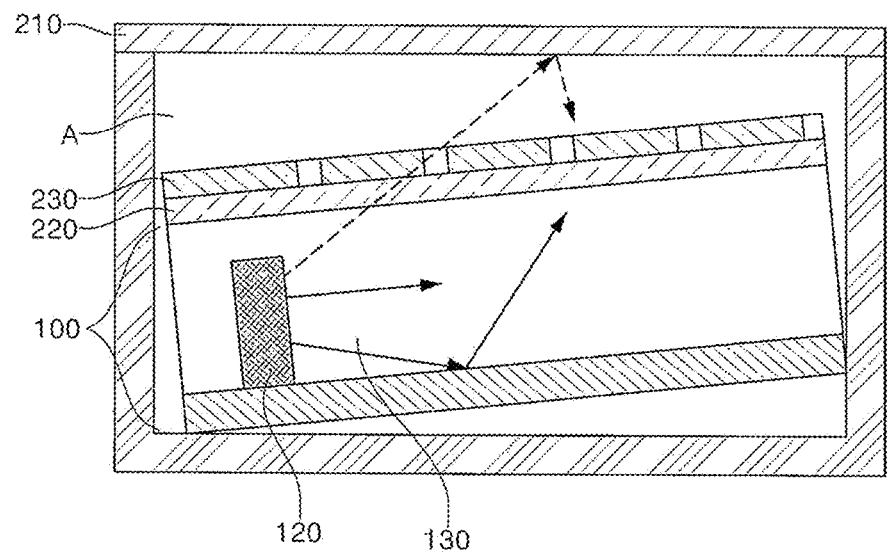
Figure 15:
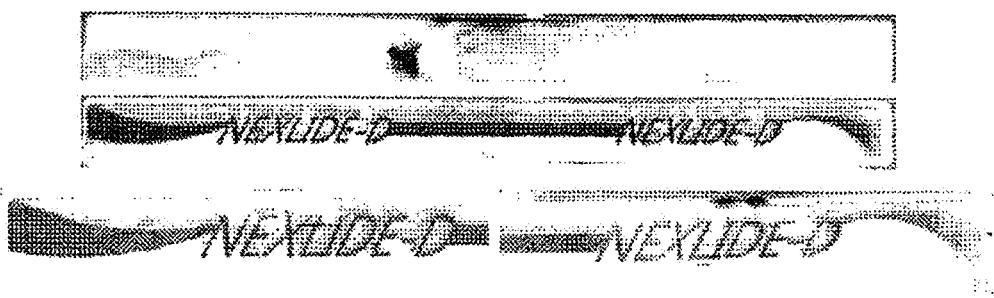

That is, as illustrated in FIG. 14, a light image having a certain three-dimensional effect is further changed by the light source module 100 being obliquely disposed in a housing 300 to have the predetermined slope based on an arrangement structure of the half-mirror member 210 (see FIG. 15).

More specifically, an extension line of a top surface of an optical member of the light source module 100 and an extension line of a bottom surface of the half-mirror member 210 may form an inclination angle. In this case, an optical pattern layer 230 in which a logo or characters are patterned is disposed on an sloped optical member 130, or a diffusion member 220 may be added to the optical member 130 and the optical pattern layer 230 may be formed to be disposed on the diffusion member 220. Due to such an arrangement, the optical member 130 emits surface light, and the light emitted from the optical member 130 is diffused through the diffusion member 220 and passes through the optical pattern layer 230. However, since the entire light source module 100 is obliquely disposed, a predetermined portion of a path of an image of light which reaches, is reflected by, and is transmitted through the half-mirror member 210 is changed, and thus an image having a three-dimensional effect may be implemented as illustrated in FIG. 15. FIG. 14 also shows that a first separation portion A may vary in thickness between a top surface of the optical pattern layer 230 and the half-mirror member 210.

Sixth Embodiment

Figure 16:
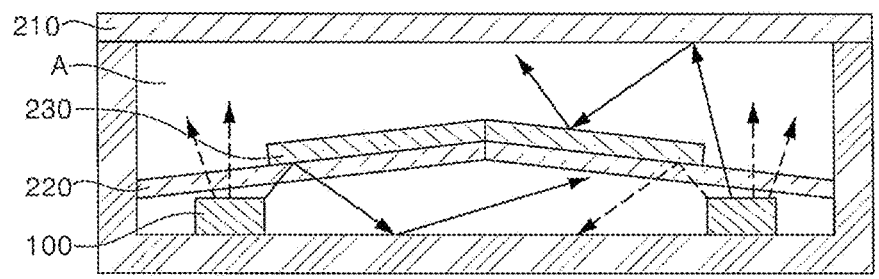

In the sixth embodiment, a level of three-dimensional effect may be adjusted on the basis of a structure disposed in parallel with an arrangement direction of a light source module of a half-mirror member 210 disposed above a light source module 100 by at least two light source modules 100 being disposed and a predetermined portion of a diffusion member 220 being obliquely disposed in a housing 300. Here, a structure of the light source module 100 is the same as the structure of the above-described first embodiment. Specifically, the light source module 100 includes the light emitting unit 120 and the optical member 130 shown in FIG. 1, and includes a device configured to emit surface light through a top surface of the optical member 130, and FIG. 16 is a view illustrating an embodiment in which two or more light source modules 100 are disposed and light is emitted upward. In the illustrated structure, the light source module 100 may be disposed such that light is also emitted toward side surfaces rather than upward.

In addition, as illustrated in FIG. 16, in the present embodiment, the diffusion member 220 may be disposed above the two light source modules 100 such that a central portion thereof is bent and obliquely disposed toward the central portion of the two light source modules 100. In addition, an optical pattern layer 230 is disposed or a metal thin film layer having a structure which performs only a reflecting function and in which a separate optical pattern is not formed (for example, an Ag thin film) is disposed on the diffusion member 220.

Figure 17:
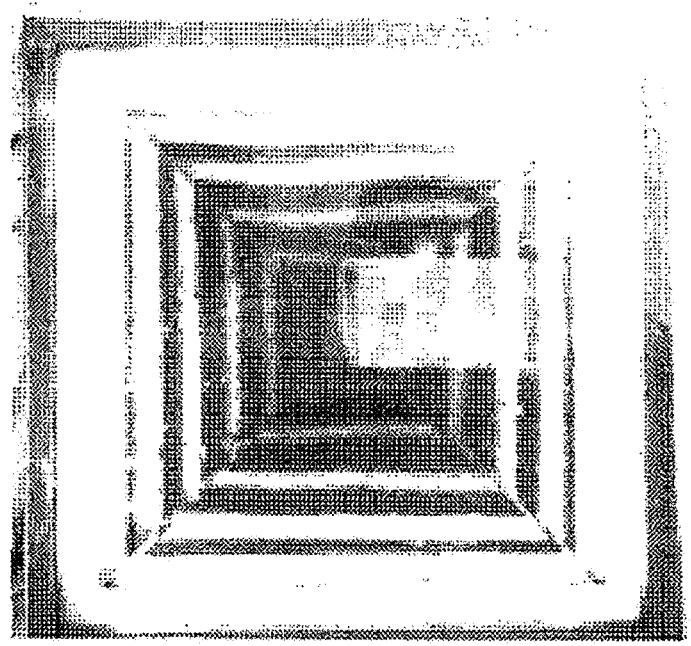

In the illustrated structure, since a metal thin film is not covered on the light source module 100, light may be transmitted, and some of the transmitted light is reflected and transmitted by the half-mirror member 210 disposed above the light source module 100, and thus a three-dimensional image may be implemented as shown in FIG. 17. Of course, the first separation portion A is formed between the diffusion member 220 and the half-mirror member 210 to more effectively implement the three-dimensional effect. To this end, the first separation portion A may be formed in a range of 1 to 4 mm, but is not limited thereto, and an inclination angle of the diffusion member with respect to a bottom surface of the half-mirror member may be variously changed according to a desired light image.

Seventh Embodiment

A structure of a lighting apparatus according to the seventh embodiment of the present invention will be described with reference to FIGS. 18 and 19. A feature of the structure of the seventh embodiment is that it is the same as that the structure in which the half-mirror member 210 is disposed in parallel above the light source module 100 of the sixth embodiment, but the structure also includes a reflection module 400 provided with a reflective layer 420 on a base material 410 having a light transmission characteristic therein. Particularly, since a surface of the reflection module has a predetermined curvature, the reflective layer 420 may also be disposed to have the predetermined curvature. Here, the reflective layer 420 may be disposed by deposition or coating. Of course, a separation portion A is formed between the half-mirror member 210 and the reflection module 400 to implement a three-dimensional effect even in the structure of the present embodiment. In addition, a structure of the light source module 100 is the same as the above-described structure according to the first embodiment.

In addition, the base material 410 is preferably formed in a structure in which one portion of the base material 410 is not covered by the reflective layer 420 so that the structure allows light emitted from the light source module 100 disposed under the base material 410 to be transmitted to an upper portion of the reflection module. Furthermore, the light transmitted to the upper portion of the reflection module is reflected and transmitted by the half-mirror member 210, and the reflected light is reflected again by a curved surface of the reflective layer 420 so that a unique three-dimensional structure is implemented as illustrated in FIG. 19.

Figure 18:
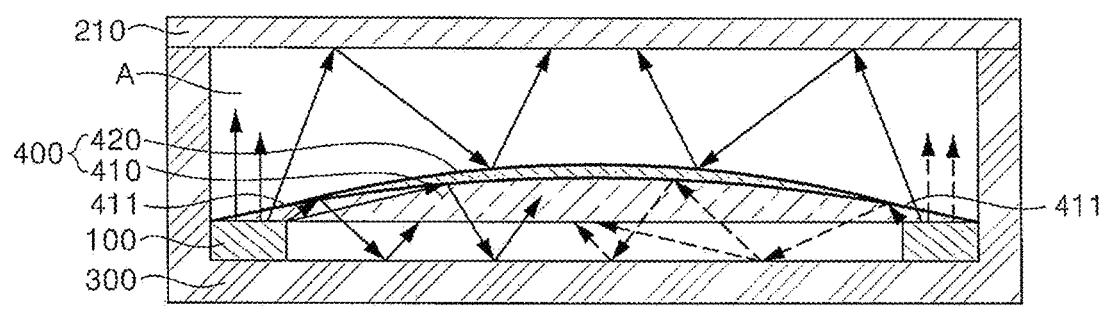
Figure 19:
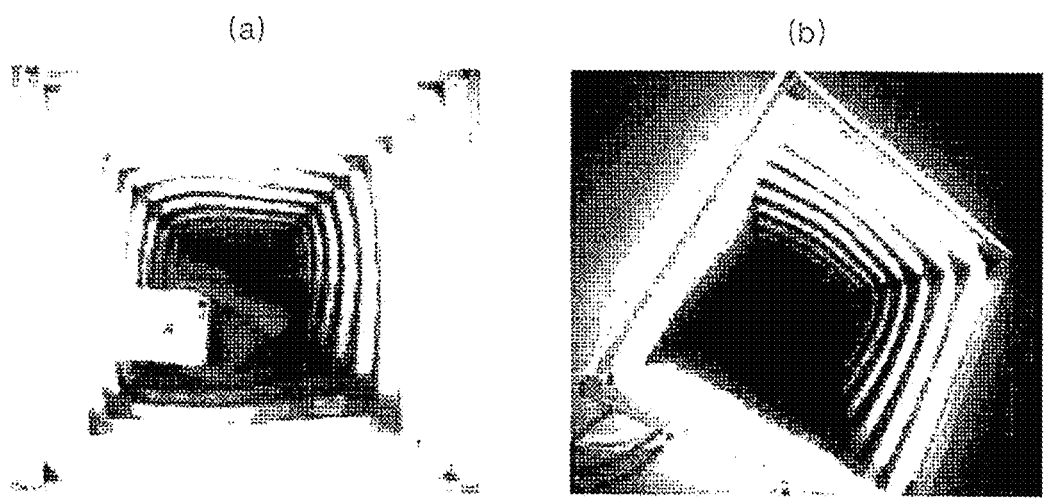

Such an image having a three-dimensional structure may be variously adjusted by adjusting a curvature of the reflection module 400, but the curvature is not entirely limited to a gentle curvature structure shown in FIG. 18, and a three-dimensional image can be variously changed by a reflective layer having a partially curved structure being disposed in a pattern type and light being transmitted toward a surface of a base material in which the reflective layer is not formed.

A synthetic resin material having high optical transmittance may be applied to the base material 410, and polyethylene terephthalate, polyethylene naphthalate, acrylic resin, polycarbonate, polystyrene, polyolefin, cellulose acetate, and a weather resistant vinyl chloride may be used for the base material 410, but the base material 410 is not limited thereto. In addition, the base material 410 may include any material including a highly permeable plastic and the like such as an acrylic resin, polymethyl methacrylate (PMMA), cyclic olefin copolymer (COC), polyethylene terephthalate (PET), and a resin capable of performing a condensing function.

In addition, the reflective layer may be formed with a metal material layer including Ag or the like having an excellent reflection characteristic, or a reflective material layer, such as $TiO_2$, $CaCo_3$, $BaSo_4$, $Al_2O_3$, silicon, and polystyrene (PS), may be coated with titanium oxide, aluminum oxide, zinc oxide, lead carbonate, barium sulfate, or calcium carbonate, and may be formed with a synthetic resin layer containing these materials.

In addition, the light source module 100 shown in FIG. 18 includes the light emitting unit 120 and the optical member 130 shown in FIG. 1, and includes a device configured to emit surface light through a top surface of the optical member 130, and FIG. 18 is a view illustrating that two or more light source modules 100 are disposed and light is emitted upward according to the embodiment. In the illustrated structure, each of the light source modules 100 may be disposed to emit light toward side surfaces rather than upward.

Figure 20:
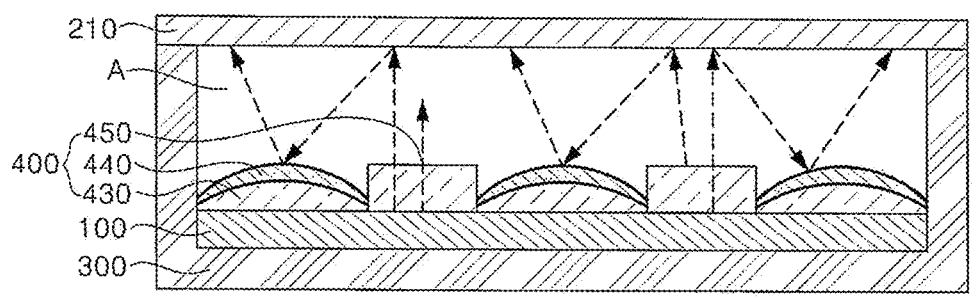

Alternatively, a structure of the reflection module 400 may also be formed differently as illustrated in FIG. 20.

A feature of a structure shown in FIG. 20 is that two or more light source modules may also be employed as illustrated in FIG. 18 even though one light source module 100 is exemplarily disposed in FIG. 20, particularly, the reflection module 400 is formed on the light source module, a plurality of unit reflection modules having curvatures are formed thereon, and the remaining portion is left as a base material portion 450 so that light may be transmitted therethrough.

Figure 21:
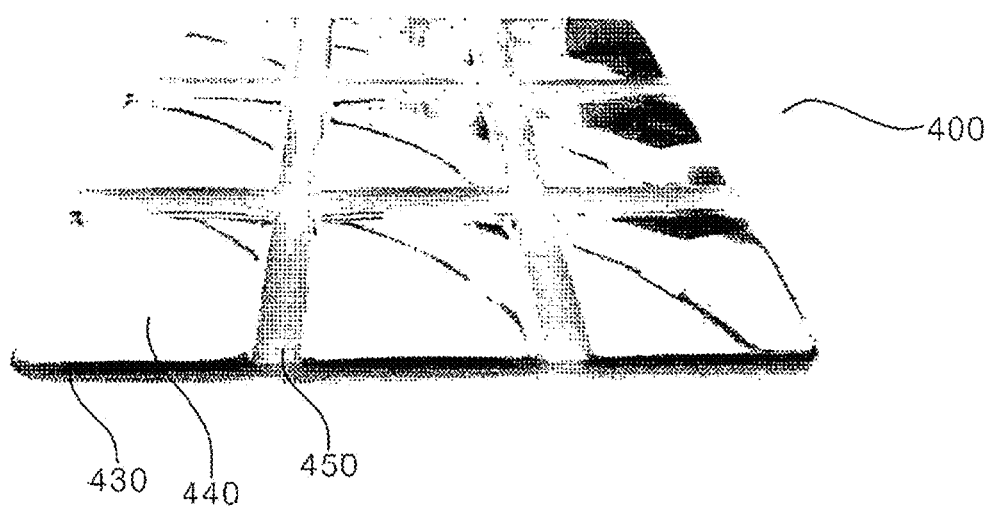
Figure 22:
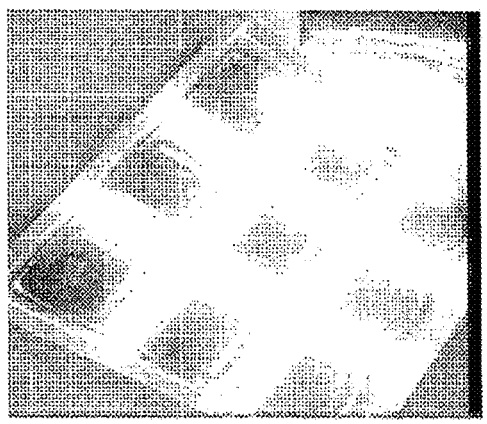
Figure 22:
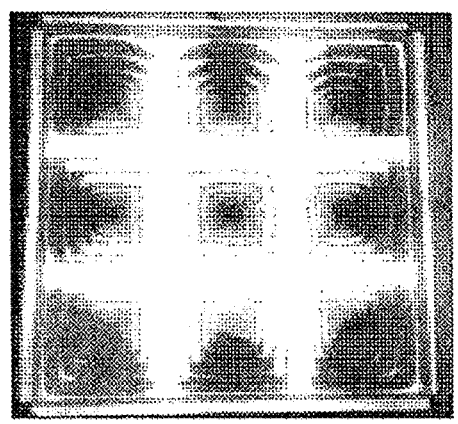

That is, in the case of a unit reflection module, a unit reflective layer 440 having a curvature is formed by a reflective material being deposited or coated on a unit base material 430 having a curvature, and a plurality of such structures are provided. Through this structure, when light emitted from the light source module 100 disposed under the base material portion 450 is transmitted upward through the base material portion 450 at which the unit reflective layer 440 is not formed and reaches the half-mirror member 210, some of the light is transmitted, the remaining light is reflected, and the reflected light is reflected again by a curved surface of the unit reflective layer 440 so that a variety of three-dimensional images are formed as shown in FIG. 22. FIG. 21 is a view illustrating an actual example of the unit reflection module according to the present embodiment.

Figure 23:
FIG. 23 is a comparison table of the number of virtual images of light which implements a three-dimensional effect to a transmittance of a half-mirror member according to the above-described various embodiments of the present invention.
Figure 23:
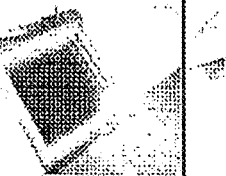
Figure 23:
Figure 23:

FIG. 23 is a comparison table of the number of virtual images of light which implement a three-dimensional effect to a transmittance of a half-mirror member according to the above-described various embodiments of the present invention. In this experiment, an image of three-dimensional light is implemented by forming a square frame as shown in FIG. 18 and forming the half-mirror member 210 by depositing Cr on a transparent substrate so that the transparent substrate has a transmittance of 20 to 50%.

It may be seen that the number of virtual images which are implemented according to a transmittance of the half-mirror member 210 is two to three based on a transmittance of 50%, and is four to five based on a transmittance of 20%, and thus a three-dimensional effect is further improved.

That is, in the various embodiments of the present invention, the number of virtual images of light is increased as a transmittance of the half-mirror member 210 is decreased. This is because an amount of light reflected toward an inside of the lighting apparatus by the half-mirror member 210 is increased and thus the number of reflections repeated therein is increased.

Accordingly, the lighting apparatus according to the embodiment of the present invention may implement an image or character having a three-dimensional effect by providing the half-mirror member 210 configured to reflect light emitted by the flexible light source module 100 configured to emit surface light, may further improve the three-dimensional effect by adjusting a transmittance of the half-mirror member 210, and may diversify such a three-dimensional effect by employing various reflection modules, arrangement structures, or optical pattern layers.

Figure 24:
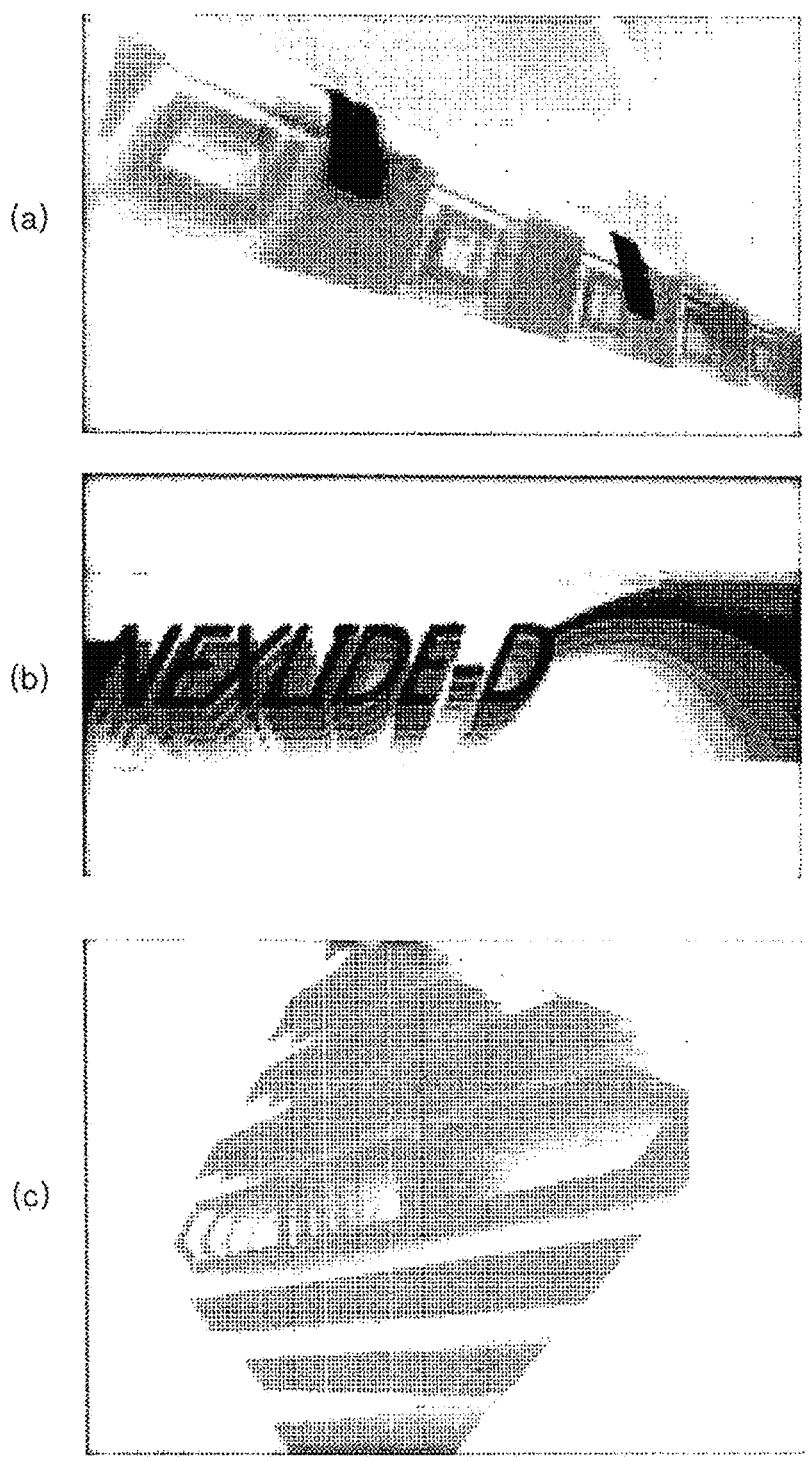
FIG. 24 shows views showing examples of various three-dimensional images implemented according to the embodiments of the present invention.

FIG. 24 shows views showing examples of various three-dimensional images implemented according to the embodiments of the present invention. The lighting apparatus according to the embodiment of the present invention capable of realizing such images may be applied to various lamp devices such as a vehicular lamp, a household lighting apparatus, and an industrial lighting apparatus, which require illumination. For example, when the lighting apparatus according to the embodiment of the present invention is applied to a vehicular lamp, it may also be applied to a headlight, a vehicle interior light, a door scarf, a rear light, and the like. In addition, the lighting apparatus according to the embodiment may be also applied to the backlighting apparatus field which is applied to a liquid crystal display (LCD) and all lighting related fields which are currently being developed and commercialized or can be implemented according to future technology developments.

Specific embodiments of the preset invention have been described above in detail. The embodiments can be variously modified without departing from the scope of the present invention. Therefore, the scope of the present invention is defined not by the described embodiments but by the appended claims, and encompasses equivalents that fall within the scope of the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting apparatus comprising:
a light source module including an optical member configured to guide light emitted by a light emitting unit to implement surface light emission; and
an optical module disposed above the light source module,
wherein the optical module comprises a half-mirror member that transmits some light emitted by the light source module and reflects the remaining light toward the light source module, and a diffusion member, which is disposed to form an inclination angle with respect to an extension line formed by a bottom surface of the half-mirror member.

2. The lighting apparatus of claim 1, wherein the optical module comprises at least one optical pattern layer disposed between the half-mirror member and the diffusion member,
wherein the optical pattern layer is disposed on the diffusion member, which is disposed to expose a surface of the diffusion member.

3. The lighting apparatus of claim 2, wherein the number of light source modules is two or more,
wherein light emitted from the light source module is diffused towards the half-mirror member by the diffusion member, and
wherein the light reflected by the half-mirror member is reflected back by the optical pattern layer.

4. The lighting apparatus of claim 2, wherein the optical pattern layer comprises a metal thin film layer on which a character or image is patterned.

5. The lighting apparatus of claim 2, wherein the diffusion member and the half-mirror member are spaced apart from each other.

6. The lighting apparatus of claim 1, wherein the optical member includes a resin layer in which the light emitting unit is embedded and which is in direct contact with a light emitting surface of the light emitting unit.

7. A lighting apparatus comprising:
a light source module including an optical member configured to guide light emitted by a light emitting unit to implement surface light emission; and
an optical module disposed above the light source module,
wherein the optical module comprises a half-mirror member that transmits some light emitted by the light source module and reflects the remaining light toward the light source module,
wherein the number of light source modules is two or more, and a reflection module disposed between the half-mirror member and the light source module is further included in the lighting apparatus.

8. The lighting apparatus of claim 7, wherein a surface of the reflection module is curved.

9. The lighting apparatus of claim 7, wherein the reflection module comprises a reflective layer formed of a structure in which one portion of a surface of a base material having light transmittancy is exposed.

10. The lighting apparatus of claim 7, wherein the reflection module includes a unit reflection module in which a reflective layer is provided on a surface of a base material having a curvature and light transmittancy and a base material portion configured to transmit light emitted by the light source module.

11. The lighting apparatus of claim 7, wherein the reflection module is disposed to be spaced apart from the optical module.

12. The lighting apparatus of claim 7, wherein the optical member includes a resin layer in which the light emitting unit is embedded and which is in direct contact with a light emitting surface of the light emitting unit.

* * * * *